United States Patent
Cermak et al.

(10) Patent No.: US 9,522,641 B1
(45) Date of Patent: Dec. 20, 2016

(54) ALGORITHM TO REMEDIATE LOST LIFETIME FUEL ECONOMY CACHED DATA UPON HARDWARE SWAP

(71) Applicant: General Motors LLC, Detroit, MI (US)

(72) Inventors: Alexander X. Cermak, Grosse Pointe Woods, MI (US); Ryan Olejniczak, Clinton Township, MI (US); Maria I. Portal, Dearborn, MI (US); Esteban Camacho, Belleville, MI (US); Jeffrey J. Haase, Sterling Heights, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/810,282

(22) Filed: Jul. 27, 2015

(51) Int. Cl.
| | |
|---|---|
| *G06F 19/00* | (2011.01) |
| *B60R 16/023* | (2006.01) |
| *G06F 17/30* | (2006.01) |
| *H04L 29/08* | (2006.01) |
| *G07C 5/00* | (2006.01) |
| *G07C 5/08* | (2006.01) |

(52) U.S. Cl.
CPC ..... *B60R 16/0236* (2013.01); *G06F 17/30864* (2013.01); *G07C 5/008* (2013.01); *G07C 5/0816* (2013.01); *H04L 67/1002* (2013.01)

(58) Field of Classification Search
CPC .. B60R 16/0236; G06F 17/30864; G07C 5/08; G07C 5/0816; H04L 67/1002
See application file for complete search history.

(56) References Cited

U.S. PATENT DOCUMENTS

| | | | | |
|---|---|---|---|---|
| 7,899,591 | B2* | 3/2011 | Shah | B60W 50/00 123/406.13 |
| 8,185,302 | B2* | 5/2012 | Schunder | G01C 21/3469 701/123 |
| 8,296,048 | B2* | 10/2012 | Henderson | B60K 35/00 180/69.4 |
| 8,554,513 | B2* | 10/2013 | Kersey | G01D 21/00 702/108 |
| 2012/0221234 | A1* | 8/2012 | Sujan | G06Q 10/04 701/123 |
| 2013/0179007 | A1* | 7/2013 | Dalum | H01M 16/006 701/2 |
| 2013/0253782 | A1* | 9/2013 | Saltsman | G01M 17/007 701/51 |
| 2013/0275013 | A1* | 10/2013 | Kote | G07C 5/008 701/51 |
| 2014/0005917 | A1* | 1/2014 | Leggett | B60R 16/0236 701/123 |
| 2015/0302670 | A1* | 10/2015 | Ulrey | G07C 5/0816 701/123 |

* cited by examiner

*Primary Examiner* — Tuan C. To
(74) *Attorney, Agent, or Firm* — Christopher DeVries; Reising Ethington P.C.

(57) ABSTRACT

A method is provided for determining a vehicle lifetime fuel economy using a remote server. The method includes retrieving from at least one vehicle control module vehicle data including an amount of total fuel used by the vehicle, determining whether the total fuel used by the vehicle is greater than or equal to a stored fuel used value, calculating an adjusted total fuel used if the total fuel used is not greater than or equal to the stored fuel used value, and calculating the lifetime fuel economy based on the adjusted total fuel used.

20 Claims, 2 Drawing Sheets

ALGORITHM TO REMEDIATE LOST LIFETIME FUEL ECONOMY CACHED DATA UPON HARDWARE SWAP

TECHNICAL FIELD

The present invention relates to determining a vehicle's lifetime fuel economy, and in particular, to determining the lifetime fuel economy when the vehicle's hardware has been replaced.

BACKGROUND

With increasing fuel costs and the implementation of government regulations concerning fuel economy, consumers are closely monitoring the fuel economy of vehicles not only at the time of purchase, but during the life of the vehicle. To this end, vehicle electronics continually calculate the lifetime fuel economy of a vehicle using an accumulated value for the amount of fuel used over the life of the vehicle divided by the miles the vehicle has driven. The amount of lifetime fuel used is typically stored in a vehicle control module such as a vehicle telematics unit. However, if the vehicle control module storing the accumulated fuel used is replaced, that value is lost and the lifetime fuel used is reset to zero. Consequently, the lifetime fuel economy calculation using the new vehicle control module fails to account for all of the fuel used prior to the hardware replacement and does not accurately reflect the true lifetime fuel economy for that particular vehicle.

SUMMARY

According to an embodiment of the invention, there is provided method for determining a vehicle lifetime fuel economy using a remote server. The method includes retrieving from at least one vehicle control module vehicle data including an amount of total fuel used by the vehicle, determining whether the total fuel used by the vehicle is greater than or equal to a stored fuel used value, calculating an adjusted total fuel used if the total fuel used is not greater than or equal to the stored fuel used value, and calculating the lifetime fuel economy based on the adjusted total fuel used.

According to another embodiment of the invention, there is provided system for determining a vehicle lifetime fuel economy. The system includes a remote server in communication with at least one vehicle control module and a mobile device. The remote server is configured to retrieve from the at least one vehicle control module vehicle data including an amount of total fuel used by the vehicle, determine whether the total fuel used by the vehicle is greater than or equal to a stored fuel used value, calculate an adjusted total fuel used if the total fuel used is not greater than or equal to the stored fuel used value, and calculate the lifetime fuel economy based on the adjusted total fuel used.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below are directed to calculating the lifetime fuel economy of a vehicle, and in particular, to maintaining the integrity of that calculation after a lifetime fuel used parameter has been compromised due to a hardware replacement. The disclosed method remedies the compromised fuel used data by caching the last known lifetime fuel used value in the system's backend.

Communications System—

Figure 1:
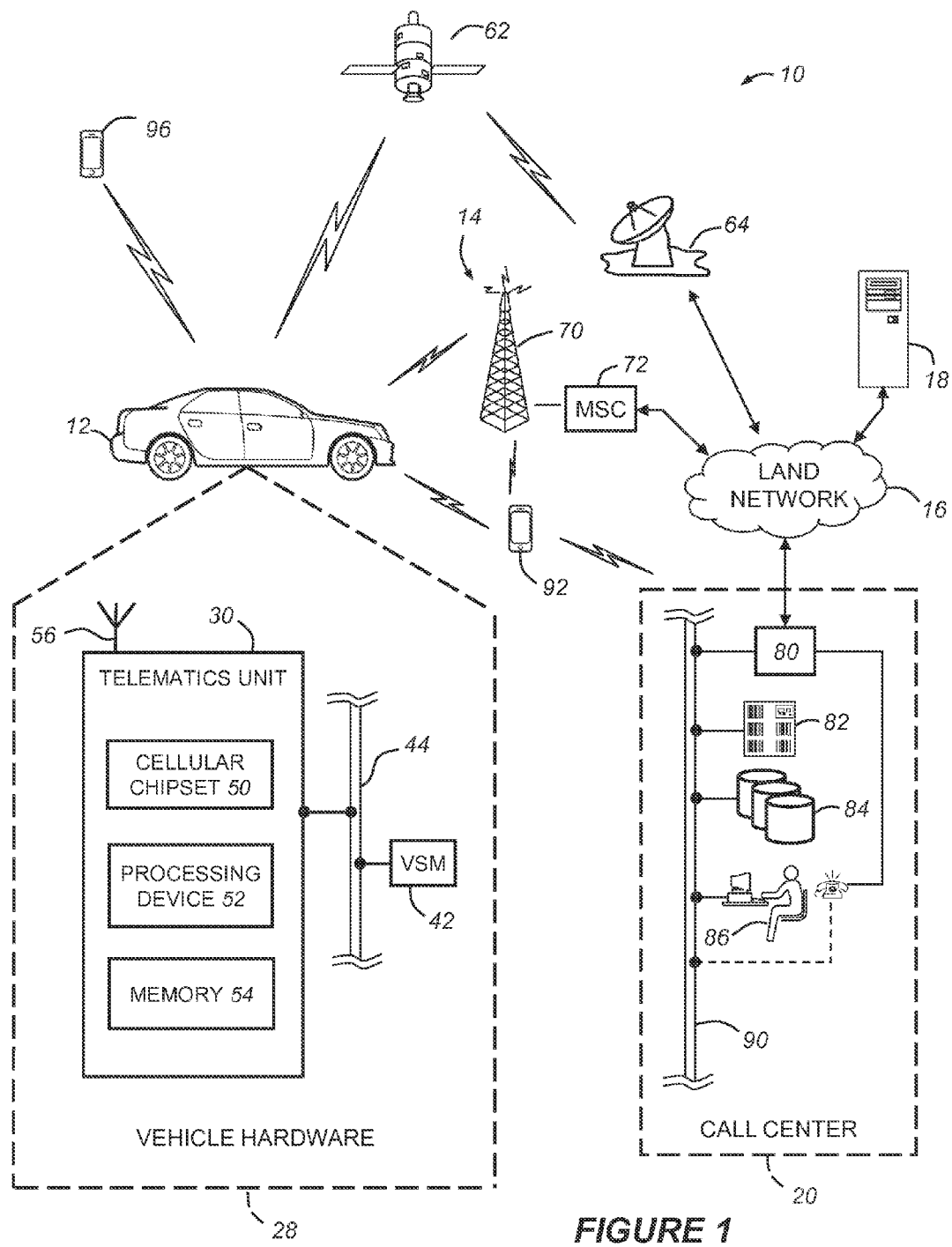
FIG. 1 is a block diagram depicting an embodiment of a communications system that is capable of utilizing the method disclosed herein.

With reference to FIG. 1, there is shown an operating environment that comprises a vehicle communications system 10 that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and include a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 30 can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit 30 to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit 30.

Vehicle system modules (VSMs) 42 in the form of electronic hardware components are located throughout the vehicle. VSMs 42 typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. In one embodiment, the vehicle data received at computer 18 may fuel and emissions related data such as an accumulated value for lifetime fuel used and lifetime fuel economy. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, and live advisors 86. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to an automated voice response system. VoIP and other data communication through the switch 80 are implemented via a modem (not shown) connected between the switch 80 and network 90. Data transmissions are passed via the modem to server 82 and/or database 84. Server 82 is a remote backend server that is accessible by the vehicle via telematics unit 30 and wireless carrier 14, and can be, for example, used to upload diagnostic information and other vehicle data from the vehicle via the telematics unit 30. Database 84 is a remote backend database configured to store account information such as subscriber authentication information, vehicle identifiers, profile records, behavioral patterns, and other pertinent subscriber information. In one embodiment, database 84 can also store vehicle data such as the accumulated value for lifetime fuel used (i.e., total fuel used) and the lifetime fuel economy. Data transmissions may also be conducted by wireless systems, such as 802.11x, GPRS, and the like.

The operating environment may further include one or more handheld communications devices (HCDs) or mobile devices 92. The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. The hardware of the mobile device 92 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, lifetime fuel economy, oil life, etc. RemoteLink™ may also allow the user to connect with the call center 20 at any time.

The mobile device hardware also may include a display, a keypad (e.g., push button and/or touch screen), a microphone, one or more speakers, motion-detection sensors (such as accelerometers, gyroscopes, etc.), and a camera. In addition to the aforementioned features, modern mobile devices may support additional services and/or functionality such as short messaging service (SMS or texts), multimedia messaging service (MMS), email, internet access, as well as business and gaming applications.

Non-limiting examples of the mobile device 92 include a cellular telephone, a personal digital assistant (PDA), a Smart Phone, a personal laptop computer or tablet computer having two-way communication capabilities, a netbook computer, or any suitable combinations thereof. The mobile device 92 may be used inside or outside of a mobile vehicle (such as the vehicle 12 shown in FIG. 1), and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 92.

The mobile device 92 and the vehicle 12 may be used together by a person known as the vehicle user such as the driver. However, the vehicle user does not need to be the driver of the vehicle 12 nor does the vehicle user need to have ownership of the mobile device 92 or the vehicle 12 (e.g., the vehicle user may be an owner or a licensee of either or both).

Method—

Figure 2:
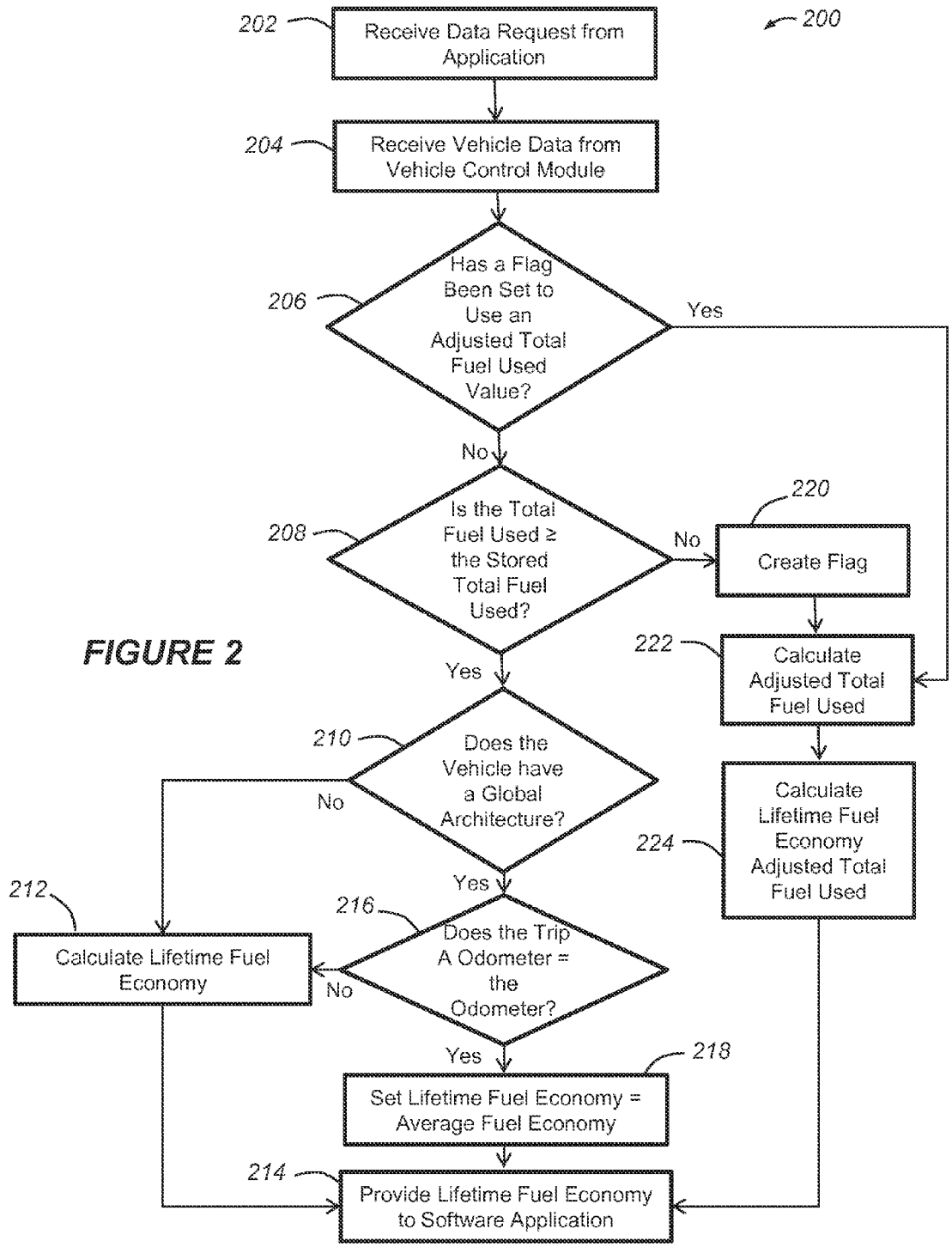
FIG. 2 is a flow chart illustrating an exemplary method for determining a vehicle's lifetime fuel economy according to one embodiment of the present invention.

Turning now to FIG. 2, there is flow chart illustrating a method 200 for determining the lifetime fuel economy for a vehicle 12. At step 202, a request is received from a software application (e.g., RemoteLink™) requesting vehicle data, such as, for example, a lifetime fuel economy. While the embodiment described below is depicts the software application being implemented on mobile device 92, one of ordinary skill in the art understands that any suitable software application residing on any computing device may be used.

In one embodiment, the request for vehicle data is received by call center 20, and in particular, remote server 82. The request may include, without limitation, data relating to the lifetime fuel economy of the vehicle 12. At step 204, the remote server 82 establishes communication with at least one vehicle control module, and in a particular embodiment, to telematics unit 30. The remote server 82 receives vehicle related data such as an accumulated value for the total fuel used, an average fuel economy, and odometer readings including total miles driven and trip odometers.

At step 206, the remote server 82 executes method 200 and determines if a flag has been set indicating that an adjusted total fuel used value should be used to calculate the lifetime fuel economy. If the flag has been set, the method proceeds to step 222. If the flag has not been set, at step 208, the remote server 82 determines if the accumulated value for the total fuel used received from the vehicle control module is greater than or equal to a stored total fuel used value. The stored total fuel used can be obtained from a previous lifetime fuel economy calculation stored in remote database 84, or from a previous lifetime fuel economy calculation that was retrieved from the software application on the mobile device 92. In essence, step 208 determines whether there has been a hardware swap resulting in a lower than expected level of consumed fuel. In other words, the fuel used values suggests a hardware replacement has occurred if the amount of total fuel used is less than the last known value of total fuel used.

If the accumulated value for the total fuel used is greater than or equal to a stored total fuel used, then at step 210 server 82 determines if the vehicle has a global electrical architecture platform that prohibits replacement of certain vehicle control modules (e.g., Global A architecture). If the vehicle in question does not have a global electrical architecture platform, then at step 212 the standard lifetime fuel economy for vehicle 12 is calculated by dividing the total miles reading from the odometer by the total fuel used value received from the vehicle control module. The lifetime fuel economy calculated at step 212 is then transmitted to the mobile device 92 at step 214 and the total fuel used is stored in the remote server 82.

If the vehicle in question does have a global electrical architecture platform, at step 216 the remote server 82 determines whether the Trip A odometer is equal to the total miles reading from the odometer. If the Trip A odometer is equal to the total miles odometer, then at step 218 the lifetime fuel economy is set equal to the average fuel economy, which is then provided to the mobile device 92 at step 214. If the Trip A odometer is not equal to the total miles odometer, then at step 212 the standard lifetime fuel economy is calculated by dividing the total miles odometer reading by the total fuel used value. The lifetime fuel economy calculated at step 212 is then transmitted to the mobile device 92 at step 214 and the total fuel used is stored in the remote server 82.

Referring back to step 208, if the accumulated value for the total fuel used is not greater than or equal to the stored total fuel used, then at step 220 a flag is created indicating that an adjusted total fuel used value should be used to calculate the lifetime fuel economy.

At step 222, an adjusted total fuel used value is calculated by adding the accumulated value for the total fuel used received from the vehicle control module to the stored total fuel used value.

At step 224 the lifetime fuel economy is calculated by dividing the total miles from the odometer reading by the adjusted total fuel used. The lifetime fuel economy calculated at step 224 is then transmitted to the mobile device 92 at step 214 and the total fuel used is stored in the remote server 82.

The method described above or parts thereof may be implemented using a computer program product may include instructions carried on a computer readable medium for use by one or more processors of one or more computers (e.g., within the HCD or telematics unit) to implement one or more of the method steps. The computer program product may include one or more software programs (or applications) comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method for determining a vehicle lifetime fuel economy using a remote server, the method comprising the steps of:

retrieving from at least one vehicle control module vehicle data including an amount of total fuel used by the vehicle;

determining whether the total fuel used by the vehicle is greater than or equal to a stored fuel used value;

calculating an adjusted total fuel used if the total fuel used is not greater than or equal to the stored fuel used value; and calculating the lifetime fuel economy based on the adjusted total fuel used.

2. The method of claim 1, wherein the vehicle data further includes a total number of miles driven.

3. The method of claim 2, further comprising calculating a standard lifetime fuel economy based on the total fuel used by the vehicle and the number of total miles driven if the total fuel used is greater than or equal to the stored fuel used value.

4. The method of claim 3, further comprising storing the total fuel used from the standard lifetime fuel economy calculation in a remote database.

5. The method of claim 3, wherein the total fuel used from the standard lifetime fuel economy calculation is saved as the stored fuel used in a remote database.

6. The method of claim 1, further comprising the step of receiving a lifetime fuel economy request from a mobile device.

7. The method of claim 6, wherein mobile device includes a software application in communication with the remote server.

8. The method of claim 7, further comprising transmitting the calculated lifetime fuel economy to the software application.

9. The method of claim 1, further comprising the step of computing the adjusted total fuel used by adding the stored fuel used value to the total fuel used by the vehicle.

10. The method of claim 1, wherein the lifetime fuel economy is calculated by dividing the number of miles driven by the adjusted total fuel used.

11. The method of claim 1, further comprising the step of receiving a lifetime fuel economy request from a software application.

12. A system for determining a vehicle lifetime fuel economy, the system comprising:

a remote server in communication with at least one vehicle control module and a mobile device, the remote server configured to:

retrieve from the at least one vehicle control module vehicle data including an amount of total fuel used by the vehicle;

determine whether the total fuel used by the vehicle is greater than or equal to a stored fuel used value;

calculate an adjusted total fuel used if the total fuel used is not greater than or equal to the stored fuel used value; and calculate the lifetime fuel economy based on the adjusted total fuel used.

13. The system of claim 12, wherein the vehicle data further includes a total number of miles driven.

14. The system of claim 13, further comprising calculating a standard lifetime fuel economy based on the total fuel used by the vehicle and the number of total miles driven if the total fuel used is greater than or equal to the stored fuel used value.

15. The system of claim 14, further comprising storing the total fuel used from the standard lifetime fuel economy calculation in a remote database.

16. The system of claim 14, wherein the total fuel used from the standard lifetime fuel economy calculation is saved as the stored fuel used value in a remote database.

17. The system of claim 12, wherein the remote server is further configured to receive a lifetime fuel economy request from an application.

18. The system of claim 17, wherein the application resides on the mobile device.

19. The system of claim 12, wherein the remote server is further configured to compute the adjusted total fuel used by adding the stored fuel used value to the total fuel used by the vehicle.

20. The system of claim 12, wherein the lifetime fuel economy is calculated by dividing the number of total miles driven by the adjusted total fuel used.

\* \* \* \* \*